(12) United States Patent
Ozawa

(10) Patent No.: US 8,249,227 B2
(45) Date of Patent: Aug. 21, 2012

(54) APPARATUS AND METHOD FOR CONVERTING CONTROL INFORMATION

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 418 days.

(21) Appl. No.: 12/557,696

(22) Filed: Sep. 11, 2009

(65) Prior Publication Data

US 2010/0002067 A1    Jan. 7, 2010

Related U.S. Application Data

(63) Continuation of application No. 11/294,447, filed on Dec. 6, 2005, now Pat. No. 7,643,621.

(30) Foreign Application Priority Data

Dec. 7, 2004 (JP) ................. 2004-353537

(51) Int. Cl.
*H04M 11/00* (2006.01)
(52) U.S. Cl. ............... 379/93.07; 348/14.01; 379/90.01; 379/93.05; 379/93.15
(58) Field of Classification Search ............. 379/90.01, 379/93.05–93.08, 93.21, 100.13; 348/14.01–14.16; 370/401, 466, 260–261
See application file for complete search history.

(56) References Cited

U.S. PATENT DOCUMENTS

| | | | |
|---|---|---|---|
| 6,373,517 B1 | 4/2002 | Davis et al. | |
| 6,754,227 B1 | 6/2004 | Peterson et al. | |
| 6,906,756 B1 * | 6/2005 | Kubota et al. | 348/554 |
| 7,203,757 B2 | 4/2007 | Murakami et al. | |
| 7,330,542 B2 * | 2/2008 | Kauhanen et al. | 379/229 |
| 2002/0198905 A1 | 12/2002 | Tabatabai et al. | |
| 2003/0048855 A1 | 3/2003 | Klaghofer et al. | |
| 2003/0072301 A1 | 4/2003 | Ko | |
| 2003/0231600 A1 | 12/2003 | Polomski | |
| 2006/0193345 A1 * | 8/2006 | Matsuda et al. | 370/467 |

FOREIGN PATENT DOCUMENTS

| | | |
|---|---|---|
| EP | 1 292 084 A2 | 3/2003 |
| JP | 10-271494 A | 10/1998 |
| JP | 2000-253403 A | 9/2000 |
| JP | 2002271438 A | 9/2002 |
| JP | 2002281104 A | 9/2002 |
| JP | 2002344559 A | 11/2002 |
| JP | 2003-8614 A | 1/2003 |
| JP | 2003-125367 A | 4/2003 |
| JP | 3095526 U | 8/2003 |
| JP | 2003-309664 A | 10/2003 |
| JP | 2004-165706 A | 6/2004 |

(Continued)

*Primary Examiner* — Melur Ramakrishnaiah
(74) *Attorney, Agent, or Firm* — Sughrue Mion, PLLC

(57) ABSTRACT

Picture and speech communication between plural terminals connected to different networks, such as a circuit-switched network and IP network. A converting apparatus 400 for control information or media information for picture/speech communications is provided across first and second terminals 301, 302 connected to respective different types of networks. Converting apparatus 400 includes control information converter 420, transcoder 450 and ability information converter 460. In case the ability information extracted from the decoding information, received from the first terminal 301, is not coincident to the ability information extracted from the call control information received from the second terminal 302, it is further checked whether or not there is picture format size coincidence. If the picture format size coincidence persists in one direction, processing is carried out for converting part of the decoding information or the control information, without causing the operations of the transcoder. In case there is no picture format size coincidence, the transcoder 450 is booted to convert the bitstream.

2 Claims, 5 Drawing Sheets

FOREIGN PATENT DOCUMENTS

| | | | | | | |
|---|---|---|---|---|---|---|
| JP | 2004-310744 A | 11/2004 | KR | 2003-0031311 A | 4/2003 |
| JP | 2004-534424 A | 11/2004 | WO | 2004/075508 A1 | 9/2004 |

\* cited by examiner

APPARATUS AND METHOD FOR CONVERTING CONTROL INFORMATION

This is a continuation of application Ser. No. 11/294,447 filed Dec. 6, 2005, which claims the benefit of priority from Japanese Patent Application No. 2004-353537, filed on Dec. 7, 2004, the contents of which are incorporated herein by reference.

FIELD OF THE INVENTION

This invention relates to an apparatus and a method for converting the control information for picture/speech communication between plural terminals connected to different types of networks, such as circuit-switched network or IP network.

BACKGROUND OF THE INVENTION

In the JP Patent Kokai Publication No. JP-P2003-125367A, there is introduced an instance of a multi-media communication terminal capable of performing multi-media communications by ITU-T (International Telecommunication Union Telecommunication Standardization Sector) Recommendations H.263, retained to be indispensable in the multi-media communication terminal standard 3G-324 of 3GPP (Third Generation Partnership Project) as an picture encoding system, MPEG (Moving Picture Expert Group)-4, internationally standardized by the ISO (International Organization of Standardization)/IEC (International Electrotechnical Commission), AMR, retained to be indispensable in the 3G-324 as a speech encoding system, or by ITU-T Recommendations G723.1 etc.
[Patent Document 1]
JP Patent Kokai Publication No. JP-P2003-125367A

SUMMARY OF THE DISCLOSURE

However, if the terminals, as stated in the above Laid-Open Patent Document, are connected to respective different types of networks, the codecs mounted on the two terminals differ from each other, such that it is not possible for one of the terminals to decode the compressed stream, prepared on encoding for compression and sent by the counterpart side terminal, with the result that, in the absence of proper countermeasures, the picture/speech communication is not feasible.

After all, in the above-described case, there lacks a communication path over which the control information for, e.g., the codecs, mounted on the respective terminals, may be transmitted between the two terminals, with the result that the information as to which codec is mounted on any one of the terminals cannot be communicated to a counterpart side terminal, and hence the communication cannot be carried out between the terminals.

In view of the above-depicted status of the art, it is an object of the present invention to provide an apparatus and a method whereby, in the picture/speech information between the terminals connected to different types of networks, such as circuit-switched network or IP network, the control information may be converted for establishing the communication even in case the codec provided to one of the terminals differs from that provided to the counterpart side terminal.

In one aspect, the present invention provides an apparatus for converting control information or media information for picture/speech communication between first and second terminals connected to respective different types of networks. The apparatus comprises a converter for conversion of the call control information (or the decoding information), attendant on the control information or the media information. The converter effects converting processing (in the first direction) for converting decoding information (or call control information) acquired from the first terminal belonging to one network into call control information (or decoding information) to output the resulting information to the second terminal belonging to the other network. The converting apparatus also converts (in the second direction) the call control information (or the decoding information) acquired from the second terminal into the decoding information (or the call control information) to output the resulting information to the first terminal.

In a second aspect, the present invention provides a method for converting control information or media information for picture/speech communication between first and second terminals connected to respective different types of networks. With this method, a converting apparatus, which has acquired decoding information (or call control information) from the first terminal, converts decoding information (or call control information) into the call control information (or the decoding information) to output the resulting information to the second terminal. On acquisition of call control information (or decoding information) from the second terminal, the converting apparatus converts the call control information (or the decoding information) into decoding information (or call control information) to output the resulting information to the first terminal.

The meritorious effects of the present invention are summarized as follows.

According to the present invention, communications can be established even if, in the communications between terminals to be connected to different networks, such as between a mobile phone terminal and a SIP (Session Initiation Protocol) terminal, the ability information format of one of the terminals differs from that of the other terminal.

PREFERRED EMBODIMENTS OF THE INVENTION

Figure 1:
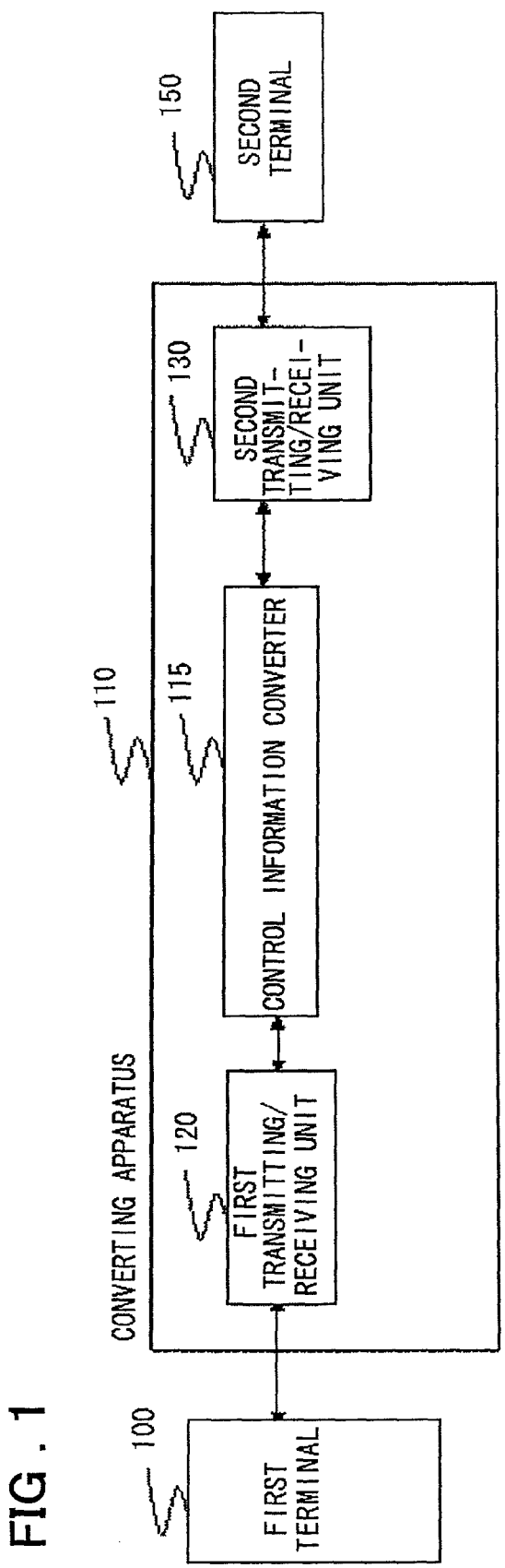
FIG. 1 is a block diagram showing the configuration of a converting apparatus for the control information according to a first embodiment of the present invention.

Referring to the drawings, preferred embodiments of the present invention will be explained in detail. FIG. 1 depicts a block diagram showing the configuration of an apparatus for converting the control information according to a first embodiment of the present invention. Specifically, FIG. 1 shows a converting apparatus 110, arranged between a first terminal 100 and a second terminal 150. In the following, it is assumed that the first terminal 100 is connected to a circuit-switched network and the second terminal 150 is connected to an IP network.

The first terminal 100 is such a device which is supplied with moving picture signals, compresses/encodes the moving picture signals, in accordance with the DCI (Decoder Configuration Information) as set from the outset in a moving picture encoder, not shown, and outputs an encoded bit stream to the converting apparatus 110.

The first terminal 100 sends to the converting apparatus 110 decoding information, for example, the aforementioned DCI, mounted thereon and representing the ability information of the codec pertinent to a stream the first terminal can validly receive from the counterpart party.

On the other hand the second terminal 150 sends call control information, representing the ability information of the codec mounted thereon, to the converting apparatus 110.

The converting apparatus 110 is, e.g., a gateway device including a first transmitting/receiving unit 120, a second transmitting/receiving unit 130 and a control information converter 115.

When the first transmitting/receiving unit 120 has received the decoding information and the bitstream from the first terminal 100, the converting apparatus 110 allows the decoding information to be sent to the control information converter 115.

The control information converter 115, which has acquired the decoding information, retrieves the ability information, for example, the aforementioned DCI, contained in the received decoding information, from the first terminal 100, using, e.g., the ITU-T standard H-245 protocol, and converts the so retrieved ability information into the description of the SDP (Session Description Protocol), as prescribed in, for example, the IETF RFC Recommendations RFC2327, to output the resulting call control information to the second transmitting/receiving unit 130. This second transmitting/receiving unit 130 sends the call control information to the second terminal 150.

The signal flow from the second terminal 150 towards the first terminal 100 will now be explained. When the second transmitting/receiving unit 130 has received call control information and a bitstream from the second terminal 150, the converting apparatus 110 allows the call control information to be sent to the control information converter 115.

On acquisition of the call control information, the control information converter 115 extracts the ability information of the second terminal, such as the SDP information as set by IETF RFC, contained in the call control information received from the second terminal 150, and converts the so extracted ability information into decoding information that can be read/understood by the first terminal, such as the aforementioned DCI, to output the so produced decoding information to the first transmitting/receiving unit 120. This first transmitting/receiving unit 120 sends the resulting decoding information to the first terminal 100.

Thus, even if, in the communication between two different networks, the format of the ability information of one of two terminals involved in the communication differs from that of the counterpart side terminal, such as when the format of one of the terminal is DCI and that of the other terminal is SDP, the communication may be established by interposing the converting apparatus configured for converting the control information.

Figure 2:
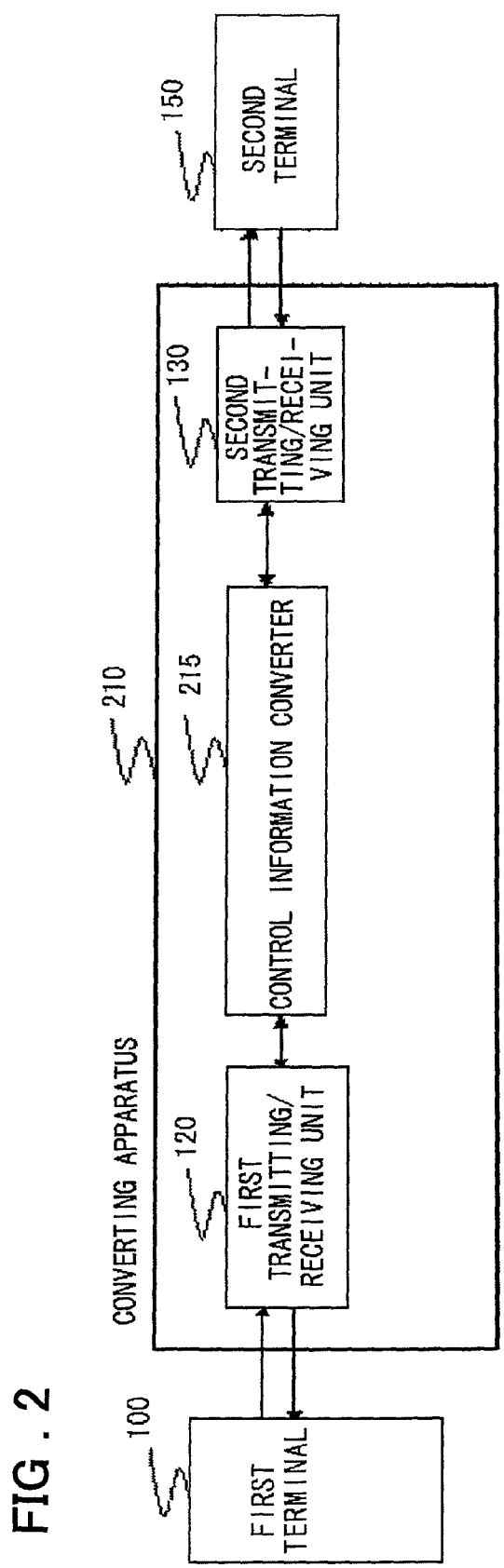
FIG. 2 is a block diagram showing the configuration of a converting apparatus for the control information according to a second embodiment of the present invention.

A second embodiment of the present invention, realizing the ability information negotiation between the two terminals, will now be explained. The components of the second embodiment which are the same as those of the first embodiment are omitted in the explanation for simplicity. FIG. 2 depicts a block diagram showing the structure of a converting apparatus for the control information according to the second embodiment of the present invention. Referring to FIG. 2, there is shown a converting apparatus 210 arranged between the first terminal 100 and the second terminal 150. In the following explanation of the present second embodiment, it is again assumed that the first terminal 100 is connected to a circuit-switched network, while the second terminal 150 is connected to an IP network.

The converting apparatus 210 is, e.g., a gateway device comprising a first transmitting/receiving unit 120, a second transmitting/receiving unit 130 and a control information converter 215.

When the first transmitting/receiving unit 120 has received the decoding information and a bitstream from the first terminal 100, the converting apparatus 210 allows the call control information to be sent to the control information converter 215.

The control information converter 215 retrieves the ability information, such as DCI of the MPEF-4 standard, contained in the decoding information, received from the first terminal 100, and changes the so retrieved information into the description of, e.g., SDP prescribed in the IETF RFC, by way of conversion into call control information, to output the so produced information to the second transmitting/receiving unit 130. This second transmitting/receiving unit 130 sends the resulting call control information to the second terminal 150.

The second terminal 150 extracts the ability information, set forth in the description of the SDP, from the call control information, received from the second transmitting/receiving unit 130, and determines whether or not the so extracted information contains the ability information the second terminal is able to receive. If the extracted information contains the ability information the second terminal 150 is able to receive, the second terminal returns a response signal of that effect to the converting apparatus 210. If the ability information, obtained from the call control information, does not contain the ability information the second terminal is able to receive, the second terminal returns a negative response.

If an affirmative response is received from the second terminal 150, the control information converter 215 of the converting apparatus 210 converts the affirmative response into a form that permits the first terminal 100 to receive the response. The converting apparatus then sends the so produced affirmative response to the first terminal. By the above processing, a negotiation of the ability information is carried out between the second terminal 150 and the first terminal 100 (as a whole, generally, in the direction from the first to the second terminal).

The negotiation of the ability information in a direction from the second terminal 150 to the first terminal 100 is carried out in a similar manner to that in the direction from the first terminal 100 towards the second terminal 150 described above.

Thus, even if, in the communication between two different networks, the format of the ability information of one of two terminals involved in the communication differs from that of the counterpart side terminal, such as when the format of the first-stated terminal is DCI and that of the second-stated terminal is SDP, the communication can be established by interposing the converting apparatus configured for converting the control information.

Figure 3:
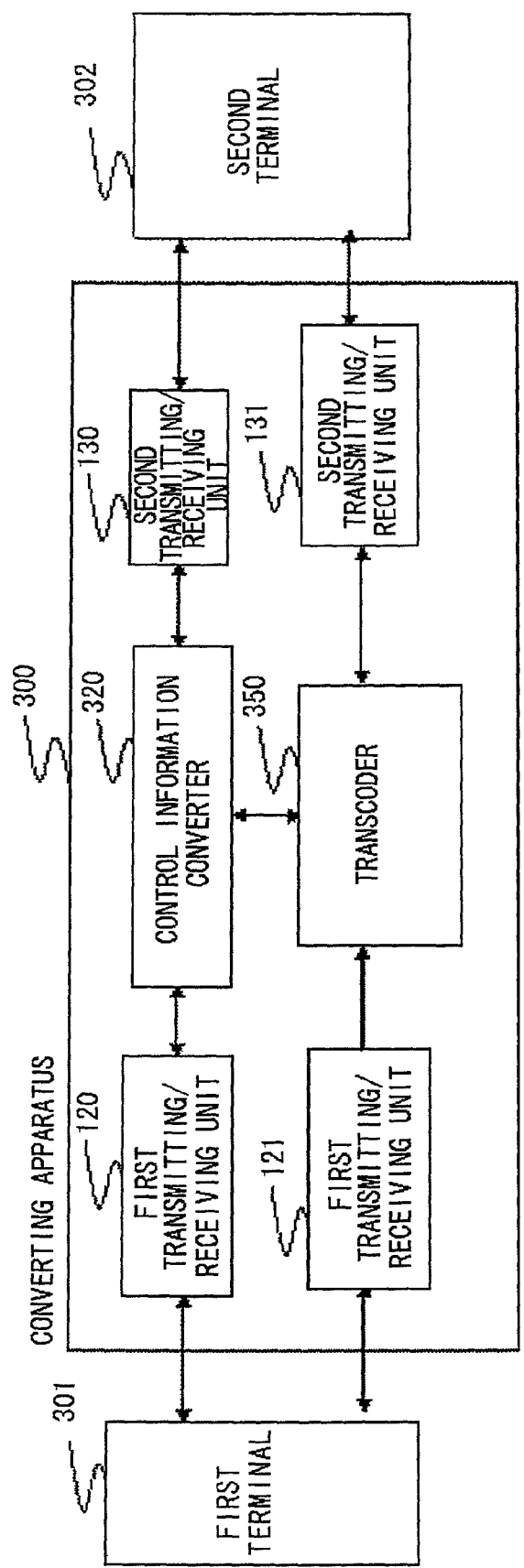
FIG. 3 is a block diagram showing the configuration of a converting apparatus for the control information according to a third embodiment of the present invention.

A third embodiment of the present invention, including a converter (transcoder) in the converting apparatus, will now be explained. The components of the second embodiment which are the same as those of the first embodiment are omitted in the explanation for simplicity. FIG. 3 depicts a block diagram showing the configuration of an apparatus for converting the control information according to a third embodiment of the present invention. Specifically, FIG. 3 shows a converting apparatus 300, arranged between a first terminal 301 and a second terminal 302. In the following explanation, it is again assumed that the first terminal 301 is connected to a circuit-switched network and the second terminal 302 is connected to an IP network.

The converting apparatus 300 includes a control information converter 320, a transcoder 350, first transmitting/receiving units 120, 121 and second transmitting/receiving units 130, 131. The converting apparatus 300 receives the decoding information, such as DCI of the MPEG-4 standard, using, e.g., the ITU-TH. 245 standard, while receiving the call control information, such as the SDP information prescribed by IETF RFC, from the second terminal 302.

The transcoder (converter) 350 is made up by a picture transcoder and a speech transcoder.

In the above configuration, the control information converter 320 extracts the first ability information, pertinent to, e.g., a codec, mounted on the first terminal 301, from the decoding information received from the first terminal 301, while extracting the second ability information, pertinent to, e.g., a codec, mounted on the second terminal 301, from the call control information received from the second terminal 302.

The control information converter 320 then determines whether or not the first ability information and the second ability information coincide with each other. If the first ability information and the second ability information do not coincide with each other, the control information converter causes the transcoder (converter) 350 to be booted. Depending on the state of non-coincidence of the ability information, the transcoder (converter) 350 performs processing by the picture transcoder and/or by the speech transcoder.

As an example, a case where the first ability information and the second ability information are not coincident with each other, such that the picture transcoder is booted, will now be explained. The transcoder (converter) 350 effects stream conversion so that a video stream encoded for compression by one of the terminals will become decodable by the counterpart side terminal. The transcoder then outputs the so converted stream. For example, assume that the H.263 video codec and the MPEG-4 video codec are mounted on the second terminal 302 and on the first terminal 301, respectively. The picture transcoder transcodes the H.263 stream, received from the second terminal 302 over the second transmitting/receiving unit 131, into the MPEG-4 stream, and outputs the so produced MPEG-4 stream to the first terminal 301 over the first transmitting/receiving unit 121.

With the present embodiment, described above, the converter(s) (at least one of the picture transcoder and the speech transcoder) is booted in case the first ability information and the second ability information are not coincident with each other, so that, even if the two terminals differ from each other as to the ability, such as that of the codec, it is possible for the two terminals to have picture/speech communication with each other.

Figure 4:
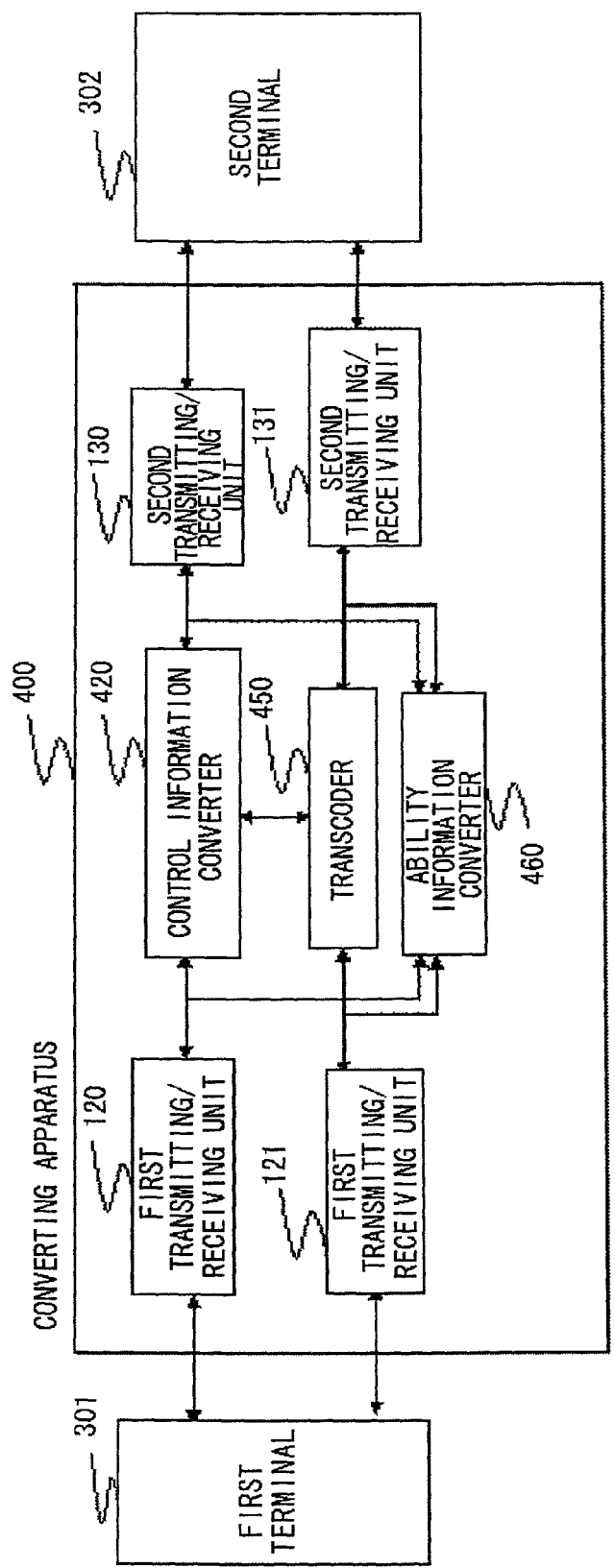
FIG. 4 is a block diagram showing the configuration of a converting apparatus for the control information according to a fourth embodiment of the present invention.

A fourth embodiment of the present invention, including a converter (transcoder) in the converting apparatus, will now be explained. The components of the fourth embodiment which are the same as those of the first to third embodiments are omitted in the explanation for simplicity. FIG. 4 depicts a block diagram showing the configuration of an apparatus for converting the control information according to the fourth embodiment of the present invention. Specifically, FIG. 4 shows a converting apparatus 400, arranged between a first terminal 301 and a second terminal 302. In the following explanation, it is assumed again that the first terminal 301 is connected to a circuit-switched network and the second terminal 302 is connected to an IP network, as in the previous embodiments.

The converting apparatus 400 includes a control information converter 420, a transcoder 450, an ability information converter 460, first transmitting/receiving units 120, 121 and second transmitting/receiving units 130, 131. The converting apparatus receives decoding information, such as DCI of the MPEG-4 standard, from the first terminal 301, using, e.g., the ITU-TH. 245 standard, while receiving call control information, such as the SDP information prescribed by IETF RFC, from the second terminal 302.

In the above configuration, the control information converter 420 extracts the first ability information, pertinent to, e.g., a codec, mounted on the first terminal 301, from the decoding information received from the first terminal 301, while extracting the second ability information, pertinent to, e.g., a codec, mounted on the second terminal 302, from the call control information received from the second terminal 302.

The control information converter 420 then verifies whether or not the first ability information and the second ability information coincide with each other. If the two information do not coincide with each other, the control information converter 420 further checks whether or not the two terminals coincide with each other as to the picture format size and, depending on the result of check, performs the following processing.

First, in case the picture format size in one of the direction from the first terminal 301 to the second terminal 302 and the direction vice versa is not coincident, but the picture format size in the other direction is coincident, only the transcoder 450 for the non-coincident direction, here the picture transcoder, is booted to convert the picture stream. As for the direction of coincidence in the picture format size, a necessary part of the DCI of decoding information or control information (for example, a part of the level information) or a necessary part of the DCI in the picture stream, is converted by the ability information converter 460 and output.

Thus, with the present embodiment, in case the ability information received from the first terminal is not coincident with that received from the second terminal, but the picture size is coincident in one of the two directions, part of the decoding information or control information or part of the decoding information in the picture stream is converted, in place of performing the converter operation, as long as the direction of the picture size coincidence is concerned. Hence, the volume of calculations may be decreased as compared to the case of the third embodiment in which processing through the converter is necessarily carried out.

Figure 5:
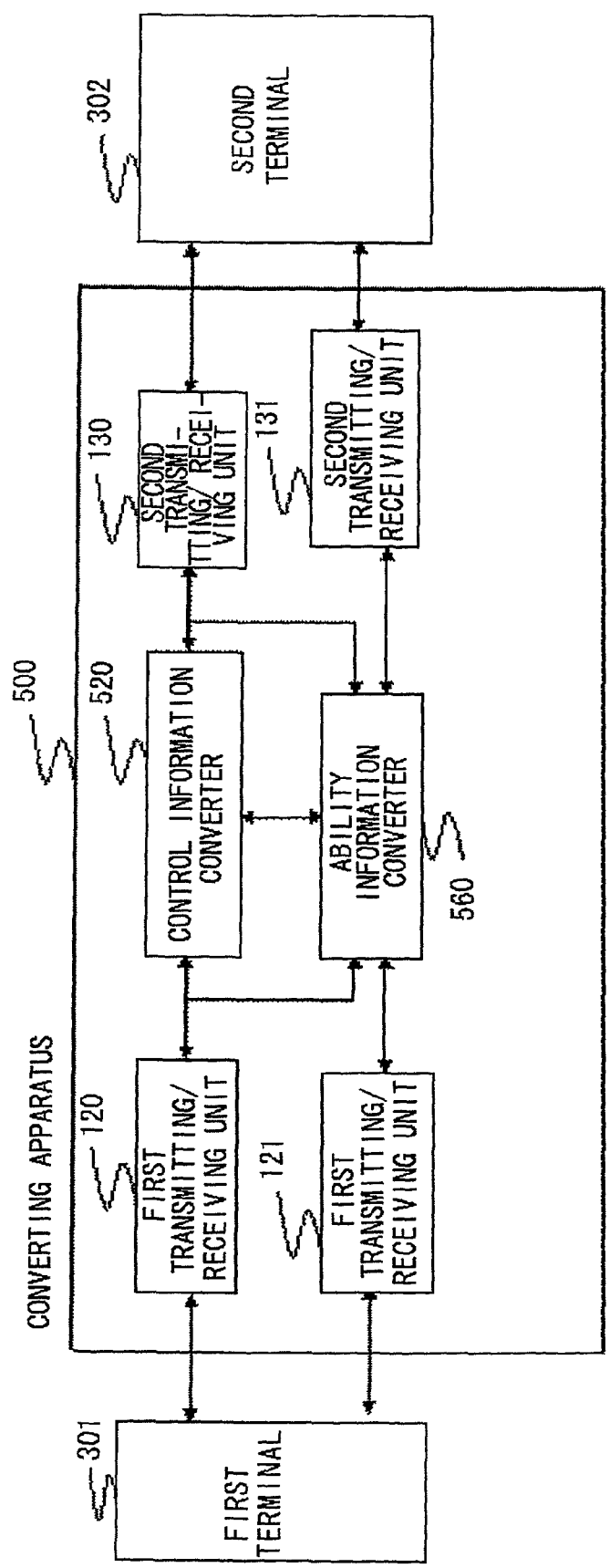
FIG. 5 is a block diagram showing the configuration of a converting apparatus for the control information according to a fifth embodiment of the present invention.

A fifth embodiment of the present invention, including a converter (transcoder), in the converting apparatus, will now be explained. The components of the fifth embodiment which are the same as those of the first to the fourth embodiments are omitted in the explanation for simplicity. FIG. 5 depicts a block diagram showing the configuration of an apparatus for converting the control information according to the fifth embodiment of the present invention. Specifically, FIG. 5 shows a converting apparatus 500, arranged between a first terminal 301 and a second terminal 302. In the following explanation, it is assumed that the first terminal 301 is connected to a circuit-switched network and the second terminal 302 is connected to an IP network, as in the previous embodiments.

The converting apparatus 500 includes a control information converter 520, an ability information converter 560, first transmitting/receiving units 120, 121 and second transmitting/receiving units 130, 131. The converting apparatus receives decoding information, such as DCI of the MPEG-4 standard, using, e.g., the ITU-TH. 245 standard, while receiving call control information, such as the SDP information prescribed by IETF RFC, from the second terminal 302.

In the above configuration, the control information converter 520 extracts the first ability information, pertinent to, e.g., a codec, mounted on the first terminal 301, from the decoding information received from the first terminal 301, while extracting the second ability information, pertinent to, e.g., a codec, mounted on the second terminal 302, from the call control information received from the second terminal 302.

The control information converter 420 then verifies whether or not the first ability information and the second ability information coincide with each other. If the two information do not coincide with each other, the control information converter further checks whether or not the picture format sizes of the two terminals coincide with each other and, depending on the result of check, performs the following processing.

First, in case the picture format size of the two terminals is coincident as to a direction from the first terminal 301 to the second terminal 302 and as to a direction from the second terminal 302 to the first terminal 301, a necessary part of the DCI of the decoding information or control information, for example, a part of level information, or a necessary part of the DCI in the picture stream, is converted by the ability information converter 560 for both directions, and output.

Thus, with the present embodiment, even in case the ability information received from the first terminal is not coincident with that received from the second terminal, but the picture size is coincident in the two directions, part of the decoding information or control information or part of the decoding information in the picture stream is converted, in place of performing the converter operation, for both the directions, and output. Hence, the volume of calculations may be decreased as compared to the case of the third embodiment in which processing is necessarily through the converter.

In the foregoing, description has been made of several embodiments of the present invention. It should be noted however that, as will be apparent from the principle of the invention, the technical scope of the present invention is not limited to the embodiments described, and that various modifications or substitutions may be made without departing from the scope of the invention which resides in the configuration of providing for the communications between terminals belonging to different sorts of the networks.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An apparatus for converting control information or the media information for picture/speech communication between first and second terminals connected to respective different types of networks, comprising
    a converter for effecting converting processing in a first direction for converting decoding information acquired from said first terminal into call control information to output the resulting call control information to said second terminal; and
    for effecting converting processing in a second direction for converting call control information acquired from said second terminal into decoding information to output the resulting decoding information to said first terminal, wherein
    at least Decoder Configuration Information DCI is received as the decoding information from said first terminal employing MPEG-4 as a system for encoding a moving picture for compression, and is converted into the call control information.

2. A method for converting control information or media information for picture/speech communication between first and second terminals connected to respective different types of networks, comprising
    a first converting step of a converting apparatus, provided between said terminals, for converting decoding information acquired from said first terminal into call control information, to output the resulting call control information to said second terminal; and
    a second converting step of said converting apparatus, for converting the call control information acquired from said second terminal into the decoding information, to output the resulting decoding information to said first terminal, wherein
    at least the Decoder Configuration Information DCI is received as the decoding information from said first terminal employing MPEG-4 as a system for encoding a moving picture for compression, and is converted into the call control information.

* * * * *